G. V. J. GUILBERT.
MECHANICAL MOVEMENT.
APPLICATION FILED NOV. 6, 1912.

1,089,762.

Patented Mar. 10, 1914.

WITNESSES:
C. G. McGee.
Edward R. Whitman

INVENTOR
Gaston Victor Justin Guilbert
BY
Emil Bonnelycke
ATTORNEY.

UNITED STATES PATENT OFFICE.

GASTON VICTOR JUSTIN GUILBERT, OF PARIS, FRANCE.

MECHANICAL MOVEMENT.

1,089,762.   Specification of Letters Patent.   Patented Mar. 10, 1914.

Application filed November 6, 1912. Serial No. 729,816.

*To all whom it may concern:*

Be it known that I, GASTON VICTOR JUSTIN GUILBERT, a citizen of the Republic of France, and resident of Paris, France, have invented a new and useful Mechanical Movement, which invention is fully set forth in the following specification.

This invention relates to what is known as the Geneva mechanical movement for transforming a continuous rotary movement into an intermittent rotary movement of several periods.

The mechanism in question comprises two elements, namely, the element which has a continuous rotary movement, and a second element which, actuated by the first named element, transforms the rotary movement into movement by sudden jerks. It is with the construction of this last element, the driven element, that the present invention is concerned.

Figure 1:
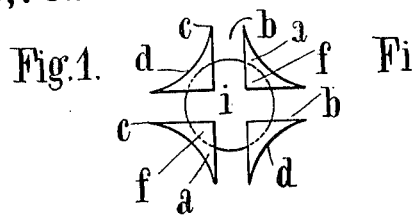
Figure 2:
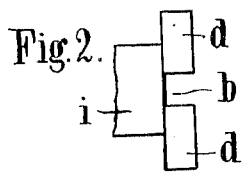

The driven element of an ordinary Geneva movement, shown in Figures 1 and 2 of the accompanying drawings, consists of a disk $a$ in which are formed diametrical grooves $b$ connected at their outer ends for their full depth by cylindrical concave parts, the surfaces $d$ of which stand at their ends tangentially or at an angle to the planes limiting the sides of the grooves. The cylindrical concave parts $d$ are intended to form the brake surfaces against which the cylindrical portion of the aforesaid continuously-rotating element rubs, a finger on that element engaging in the grooves $b$ for the purpose of rotating the driven element intermittently. The said cylindrical portion has the same radius of curvature as the surfaces of the recesses $d$, and when it is engaged with one of the said surfaces it holds the driven element stationary during a stopping period. This construction of the driven element is not satisfactory, firstly because the ends of the grooves being reduced to a sharp edge at $c$ (see Fig. 1) are very fragile, and secondly because the section of metal by which the parts $f$ are connected to the axis $i$ is very small. These defects render this construction deficient in strength. The arrangement which forms the subject of the present invention avoids these defects, which are also detrimental to the proper working of apparatus in which the Geneva movement is employed. For this purpose I locate the part of the driven element containing the grooves $b$ in a plane different from that occupied by the part in which the brake recesses or surfaces $d$ are formed, leaving between those parts a disk of material which assures the strength of the whole. The fragile ends $c$ of the grooves $b$ are thereby done away with. In order to render the following description as clear as possible this arrangement is represented, by way of example, in the accompanying sheet of drawings in which:—

Figure 3:
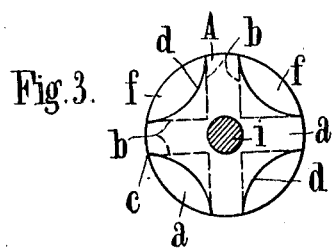
Figure 4:
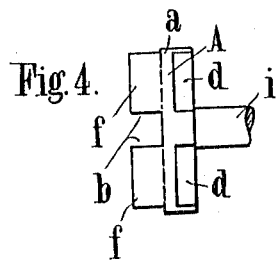
Figure 5:
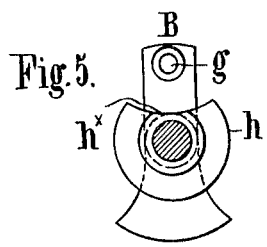
Figure 6:
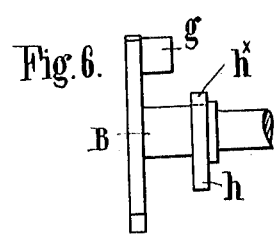
Figure 7:
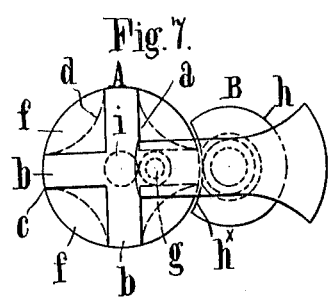
Figure 9:
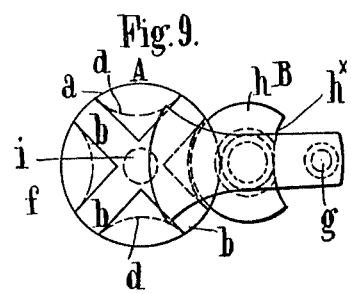
Figure 8:
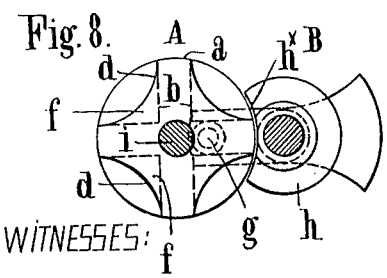

Fig. 1 is a plan view of the driven element of a Geneva movement as usually constructed. Fig. 2 is a side elevation view of same. Fig. 3 is a plan view of the driven movement of a Geneva movement constructed in accordance with my present invention. Fig. 4 is a side elevation of same. Fig. 5 is a plan view of the element having a continuous rotary motion and carrying the finger for actuating the driven element. Fig. 6 is a side elevation of same. Fig. 7 is a plan view showing the continuously rotating element with its finger engaged in one of the grooves of the driven element. Fig. 8 is a bottom plan view of the same parts as are shown in Fig. 7. Fig. 9 is a plan view showing the same parts as Figs. 7 and 8, but with the continuously rotating element in a different position, and with its cylindrical part engaged in one of the brake recesses of the driven element during a stopping period.

The driven element, A, constructed in accordance with my invention consists of a disk $a$ having the grooves $b$ formed therein, and on its edge and in a plane behind that in which the grooves $b$ are situated, are formed the cylindrical concave brake surfaces or recesses $d$. This disk $a$ may be of any suitable shape, but preferably circular as shown in Figs. 3, 7, 8 and 9, or any other shape that will make the angle subtended at $c$ by the side of the groove $b$, and the periphery of the disk $a$ so large that there will be no fear of breakage at that part.

If preferred, instead of the grooves $b$ being cut out of the disk $a$, they may be formed by attaching the angular pieces $f$, by any suitable means, to a disk on the edge of which are formed the brake recesses $d$, or the grooves may be formed on or in one disk and the recesses $d$ in another, and the two disks then secured together.

The element B, which has a continuous rotary movement, carries an actuating finger $g$ which engages in the grooves $b$ and effects the intermittent partial rotations of the driven element. Figs. 7 and 8 show the finger $g$ in engagement with one of the grooves $b$, the recess $h^x$ in the disk portion $h$ of the element B being then opposite the driven element, leaving the latter free to be turned by the finger, while in Fig. 9 the finger is out of engagement with the grooves and the circular part of the disk $h$ is engaged in one of the brake recesses $d$ and thereby prevents the rotation of the driven element during the stopping period.

In order to facilitate its entrance into the grooves $b$ and to reduce friction and consequent wear, the finger $g$ may be furnished with a friction roller or with any other device attaining an analogous result. The plate carrying the finger is counterbalanced, and is made in such a way that it or the driven element may be easily dismounted independently of one another.

Having now particularly described and ascertained the nature of my said invention, and in what manner the same is to be performed, I declare that what I claim is:—

1. In a mechanical movement, the combination with a continuously rotating driving element comprising an actuating member and a braking member, of a driven element adapted to be intermittently rotated by said driving element, said driven element having a series of recesses for engagement with said braking member and a second series of recesses located in a plane different from that in which said first series of recesses is located, so as to leave a disk-like strengthening portion between said first and second series of recesses, the said second series of recesses being adapted to be successively engaged by said actuating member.

2. In a mechanical movement, the combination with a continuously rotating driving element comprising an actuating member and a braking member, of a driven element adapted to be intermittently rotated by said driving element and consisting of an integral disk having a series of recesses for engagement with said braking member and a second series of recesses located in a plane different from that in which said first series of recesses is located and adapted to be successively engaged by said actuating member.

In testimony whereof I have signed this specification in the presence of two subscribing witnesses.

GASTON VICTOR JUSTIN GUILBERT.

Witnesses:
EMILE LEDREL,
HANSON C. COXE.

Copies of this patent may be obtained for five cents each, by addressing the "Commissioner of Patents Washington, D. C."